United States Patent [19]

Yoshimoto et al.

[11] 4,315,800

[45] Feb. 16, 1982

[54] NUCLEAR REACTOR

[75] Inventors: Yuichiro Yoshimoto; Hiroshi Kodama, both of Hitachi, Japan

[73] Assignee: Hitachi, Ltd., Tokyo, Japan

[21] Appl. No.: 142,817

[22] Filed: Apr. 22, 1980

[30] Foreign Application Priority Data

Apr. 28, 1979 [JP] Japan .................................. 54-52756

[51] Int. Cl.³ .............................................. G21C 19/28
[52] U.S. Cl. .................................. 376/246; 73/861.63; 138/44; 165/104.31; 376/402
[58] Field of Search ............................. 176/64, 65, 87; 165/107 R; 138/44; 73/213

[56] References Cited

U.S. PATENT DOCUMENTS 3,467,578 9/1969 Kornbichler .......................... 176/65
4,039,377 8/1977 Andrieu ................................. 176/65

Primary Examiner—Donald P. Walsh
Attorney, Agent, or Firm—Craig and Antonelli

[57] ABSTRACT

A nuclear reactor having a vertical annular space defined between a shroud enclosing a reactor core and a pressure vessel surrounding the shroud, and a plurality of internal circulation pumps disposed in a lower portion of the space for forcing a coolant in the space to flow into below the reactor core so that the coolant flows through the core in forced circulation. A tubular guide member is disposed adjacent to a suction port of each internal pump for vertically guiding a flow of the coolant being sucked into the pump to increase the effective inertia of the flow of the coolant, thereby to enhance the stability of the flow conditions of the coolant flowing through the reactor core.

10 Claims, 3 Drawing Figures

NUCLEAR REACTOR

BACKGROUND OF THE INVENTION

This invention relates to nuclear reactors, and more particularly to the improvement of a nuclear reactor of the type which is provided with internal pumps for forcing a coolant to circulate within the reactor through a reactor core.

The aforesaid type of nuclear reactor comprises a shroud enclosing the reactor core, and a pressure vessel surrounding the shroud, with a vertical annular space being defined between the shroud and the pressure vessel. Installed in a lower portion of the vertical annular space are a plurality of internal circulation pumps for forcing a coolant in the vertical annular space to flow into below the reactor core so that the collant flows through the reactor core in forced circulation.

One of the problems encountered with regard to the aforesaid type of reactor is that the flow conditions of the coolant flowing through the reactor core tend to become unstable. For example, if the flow of the coolant in the reactor core is influenced by some disturbance, the flow rate of the coolant will tend to fluctuate, and once fluctuation of the flow rate occurs the flow rate repeatedly increases and decreases before stable flow conditions are restored after a prolonged period of fluctuation.

Reactors belonging to the aforesaid type include those of different constructional arrangements, and in some of them difficulties have been experienced in obtaining measurements of the flow rate of a coolant flowing through the reactor core due to the positional relation of equipment arranged in the pressure vessel and elsewhere.

SUMMARY OF THE INVENTION

A principal object of this invention is to improve the stability of the flow conditions of a coolant flowing through a reactor core of a nuclear reactor of the type which is provided with internal pumps for forcing a coolant to circulate within the reactor through the core.

Another object is to provide, in a nuclear reactor of the type described, means for effectively measuring the flow rate of the coolant flowing through the reactor core.

The present invention is based on the following principle. In a nuclear reactor of the type provided with internal pumps for forcing the coolant to circulate within the reactor through the core, as above mentioned, it has been experienced that the flow conditions of the coolant flowing through the core is apt to become unstable, which is a phenomenon inherent in this type of nuclear reactor. It has been assumed that the phenomenon is attributed to a reduction in time constant T and an increase in gain C in the following equation (1) representing dynamic characteristics of the flow of a coolant through an internal pump which are caused by some disturbance affecting the flow of the coolant:

$$\Delta W = - \frac{C}{1 + TS} \Delta P \quad (1)$$

where
- $\Delta W$: change in flow rate.
- $\Delta P$: change in pressure.
- C: gain.
- T: time constant.
- S: Laplace arithmetic unit.

Of all the factors governing the dynamic characteristics of the coolant in equation (1), we have observed the time constant T and carried out its analysis. As a result, it has been found that the time constant T is in inverse proportion to a pressure loss occurring when the coolant flows through each internal circulation pump and in proportion to the effective inertia of the coolant being sucked into each pump. In other words, it has been found that the time constant T in equation (1) can be expressed by equation (2) as follows:

$$T = K \frac{Lo/A}{\Delta P_{p \cdot o}} \quad (2)$$

where
- $P_{p.o}$: pressure loss in internal pump section.
- $\Delta Lo/A$: effective inertia of coolant being sucked into internal pump.
- Lo: length of fluid guide of internal pump.
- A: sectional area of suction portion of internal pump.
- K: constant.

Thus it has been turned out that in order to stabilize the flow conditions of a coolant flowing through the core of a nuclear reactor provided with internal pumps for forcing the coolant to circulate within the reactor through the core, one has only to increase the length Lo of the fluid guide of each internal circulation pump, to thereby increase the effective inertia of the coolant being sucked into the internal pump. Based on this principle, the invention provides, in a nuclear reactor of the type described, means for vertically guiding over a predetermined distance the flow of a coolant being sucked into each internal pump, to thereby substantially increase the length of the fluid guide of the pump and increase the effective inertia of the flow of the coolant.

According to the invention, there is provided, in a nuclear reactor comprising a reactor core, a shroud enclosing the reactor core, a pressure vessel surrounding the shroud and defining a vertical annular space between the vessel and the shroud, and a plurality of internal circulation pumps disposed in a lower portion of the vertical annular space for forcing a coolant in the vertical annular space to flow into below the reactor core so that the coolant flows through the reactor core in forced circulation, the improvement comprising means for vertically guiding over a predetermined distance a flow of the coolant being sucked into each internal circulation pump to increase the effective inertia of the flow of the coolant, to thereby enhance the stability of flow conditions of the coolant flowing through the reactor core.

Preferably, the predetermined distance referred to hereinabove is about two (2) to ten (10) times the diameter of a suction port of the pump when the length of the fluid guide is added to the predetermined distance.

Preferably, the guide means includes a tubular guide member disposed adjacent the suction port of each internal circulation pump and extending substantially coaxially therewith in a vertical direction. Preferably, the inner diameter of upper and lower ends of the tubular guide member is substantially equal to the diameter of inlet of a casing of the internal circulation pump, and the tubular guide member is securely connected at its lower end to upper end of the casing.

Preferably, the tubular guide member is a venturi tube and the improvement further comprises flow measurement means associated with the venturi tube for measuring the flow rate of the coolant flowing through the reactor core.

DESCRIPTION OF THE PREFERRED EMBODIMENT

Figure 1:
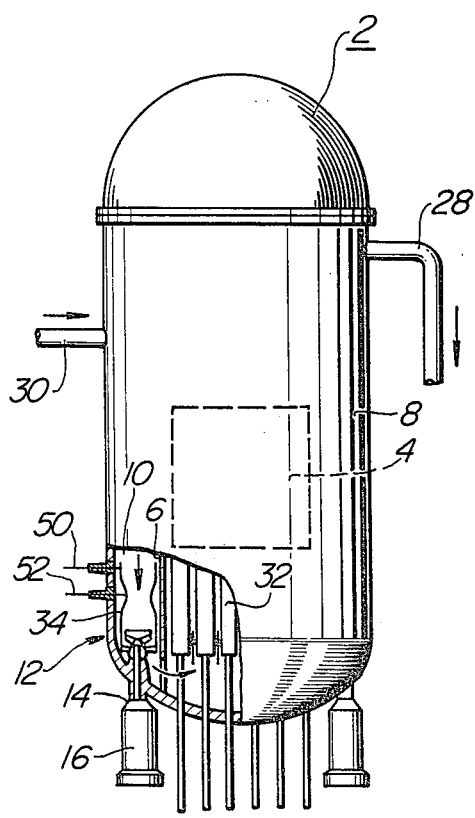
FIG. 1 is an elevation, with certain parts being shown in section, of a boiling-water reactor incorporating therein the present invention.
Figure 2:
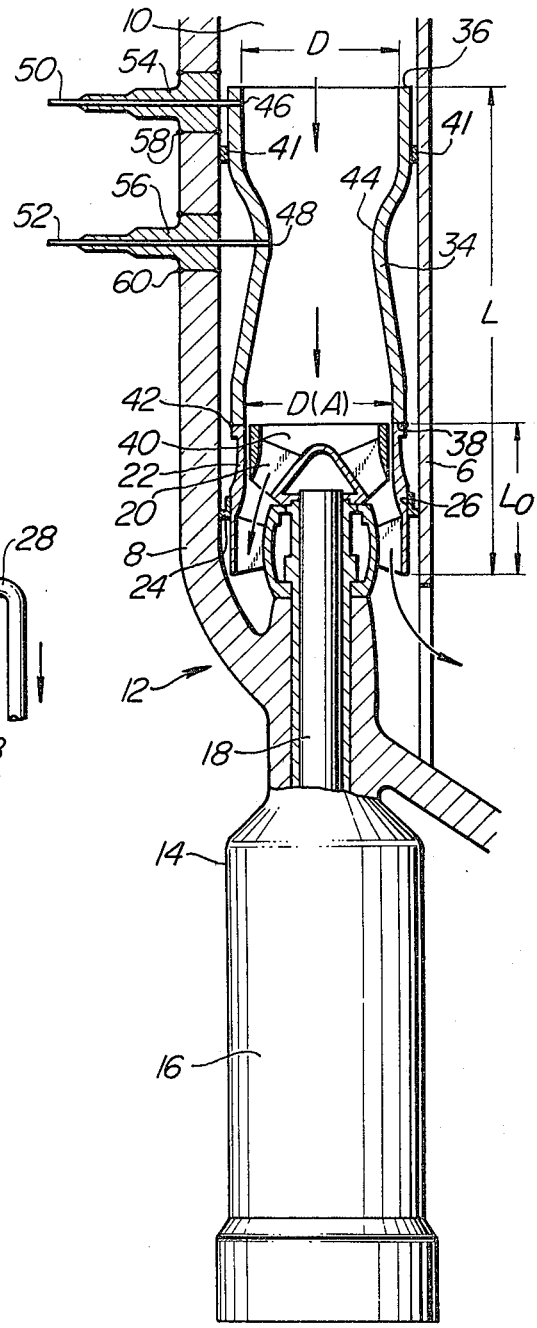
FIG. 2 is a sectional view, on an enlarged scale, of means for forcing a coolant to circulate within the reactor shown in section in FIG. 1.

In FIG. 1, a boiling-water reactor incorporating therein the improvement provided by the present invention is generally designated by the numeral 2. The reactor 2 comprises a reactor core 4, a shroud 6 enclosing the reactor core 4, and a pressure vessel 8 surrounding the shroud 6, with a vertical annular space 10 being defined between the shroud 6 and pressure vessel 8. Installed in a lower portion of the vertical annular space 10 is means 12 for forcing a coolant to circulate within the reactor 2 through the reactor core 4 comprising a plurality of internal circulation pumps 14 arranged annularly. Each pump 14 includes, as shown on an enlarged scale in FIG. 2, a motor 16 located outside the pressure vessel 8. The drive force of each motor 16 is transmitted via a shaft 18 penetrating the pressure vessel 8 to an impeller 20 located within the pressure vessel 8. The impeller 20 is enclosed in a casing 22 serving concurrently as a diffuser which is sealingly secured to an opening 26 of an annular partition plate 24 sealingly secured to a lower portion of the vertical annular space 10. The numerals 28, 30 and 32 designate a main steam conduit, a feedwater conduit and control rod housings, respectively.

The construction described hereinabove is commonly installed in a boiling-water reactor of the type provided with means for forcing the coolant to circulate within the reactor through the reactor core. The steam produced is passed through the main steam conduit 28 to a turbine, not shown, and returned to the pressure vessel 8 via the feedwater conduit 30 after doing work in the turbine. As indicated by arrows in FIGS. 1 and 2, the coolant returned to the pressure vessel 8 flows downwardly in the vertical annular space 10 and is forced to flow into below the reactor core 4 by the internal circulation pumps 14, and then flows between the control rod housings 32 into the reactor core 4 so that the coolant flows through the reactor core 4 in forced circulation.

According to the principle of the invention as above mentioned, the coolant forced circulation means 12 further comprises guide means 34 for vertically guiding a flow of a coolant being sucked into each pump 14 to increase the effective inertia of the coolant flow. The guide means 34 of the embodiment shown comprises a plurality of tubular guide members each located adjacent a suction port of one of the pumps 14 and extending substantially coaxially with the pump 14 in a vertical direction.

More specifically, each tubular guide member 34 is circular in shape and includes an upper end 36 and a lower end 38 having an inner diameter D which is substantially equal to the diameter of an inlet 40 of the casing 22 serving as the suction port of the pump 14. The tubular guide member 34 is secured at portions thereof near its upper end 36 to the shroud 6 and pressure vessel 8 by welding or other suitable means through a pair of supports 41 and at its lower end 38 to the upper end of the casing 22 by welding or other suitable means. In case the pumps 14 are of the type having a diffuser mounted separately from the casing 22 between the impeller 20 and casing 22, the tubular guide member 34 may be secured to either the casing or the diffuser. In this case also, the inner diameter of the upper end and the lower end of the tubular guide member 34, particularly of its lower end, is preferably substantially equal to the diameter of the suction port of each pump 14, in order that the coolant may flow smoothly and no adverse influences may be exerted on the enhancement of the effective inertia of the coolant flow effected by the coolant forced circulation means.

Preferably, the tubular guide member 34 has a length L which is about two (2) to ten (10) times the diameter D of the suction port of the pump 14 or the inlet 40 of the casing 22 when the length Lo of the fluid guide or the casing 22 is added to the length of the tubular guide member 34. Generally, the lower limit of the length of the tubular guide member 34 may be determined by the degree to which the tubular member 34 of a certain length can accomplish the object of increasing the effective inertia of the coolant flow as desired and the upper limit thereof may vary depending on whether or not the tubular guide member 34 of a certain length physically interferes with other structures in the reactor.

In the embodiment shown and described herein, the tubular guide members 34 are all in the form of a venturi tube. Each venturi tube 34 is tapped at 46 and 48 in a portion thereof near its upper end 36 and in a throat 44 and connected to outlet tubes 50 and 52 respectively. The outlet tubes 50 and 52 are sealingly fitted, in the same manner as is usually done in other measurement systems of a nuclear reactor, to nozzles 54 and 56 which are in turn sealingly welded to the pressure vessel 8 at 58 and 60 respectively. The outlet tubes 50 and 52 are connected, at ends thereof which are not shown, to a measurement system outside the reactor. Thus it is possible to measure the delivery made by each circulation pump 14 based on the presure differential between the taps 46 and 48, hence it is possible to determine the flow rate of the coolant flowing through the reactor core 4 by calculating the total of the deliveries made by all the internal circulation pumps 14.

The tubular guide member 34 may, of course, be in the form of a straight tube when there is no need to assign the function of flow rate measurement thereto.

In the embodiment shown and described hereinabove, the tubular guide member 34 of the coolant forced circulation means 22 performs, according to the principle of the invention as above mentioned, the function of increasing the effective inertia of the coolant flow being sucked into the pump 14 by substantially increasing the length of the flow guide of each pump 14, to thereby enhance the stability of the flow conditions of the coolant flowing through the reactor core 4 in the reactor 2.

Figure 3:
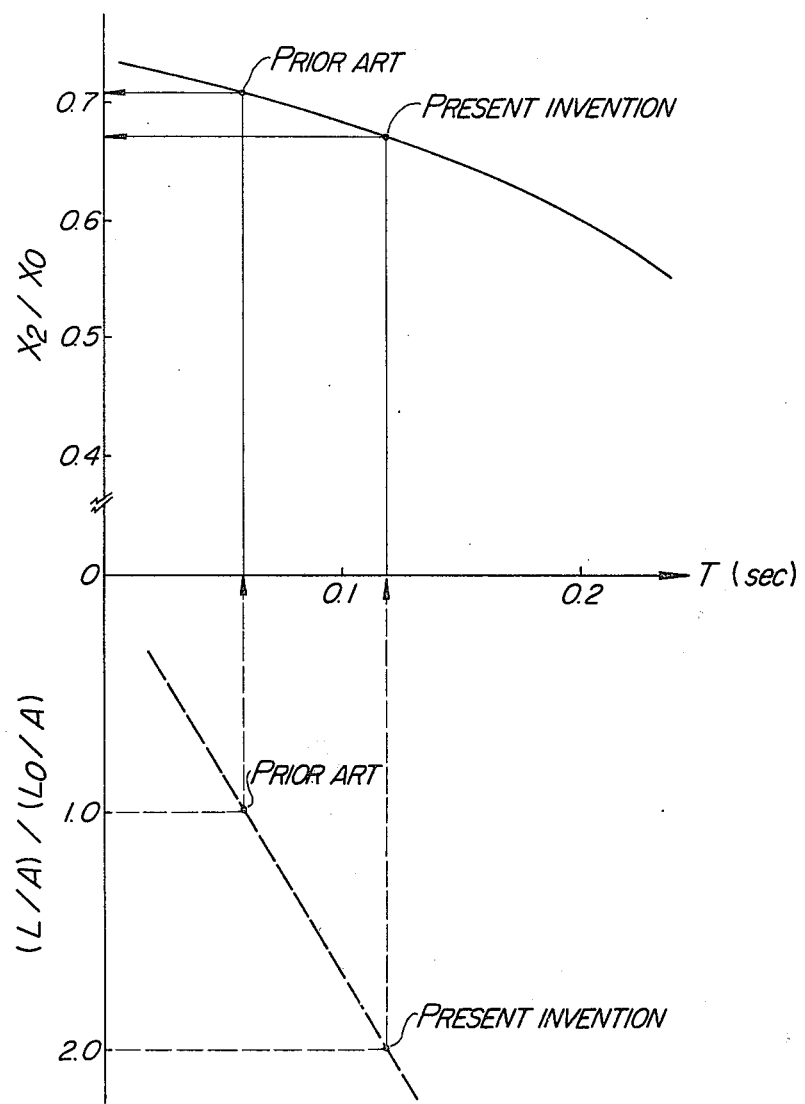
FIG. 3 is a graph showing a time constant T governing the dynamic characteristics of a fluid in relation to the fluctuation reduction ratio $X_2/X_o$, indicating that the coolant flowing through the internal circulation pumps according to the invention has a higher time constant and is more stable in its flow than the coolant flowing through internal circulation pumps of the prior art.

FIG. 3 is a graph showing a time constant governing the dynamic characteristics of a flow of a fluid in relation to the fluctuation reduction ratio $X_2/X_0$. Our analysis shows that whereas the time constant of the flow of a coolant flowing through each internal circulation pump when the coolant forced circulation means of the prior art having only internal circulation pumps is used is about 0.06, the corresponding value in the present invention in which the coolant forced circulation means further includes tubular guide members attached to the internal circulation pumps is about 0.12 to 0.6 when the length L of the tubular guide member is 2 to 10 times of the diameter D of the suction port of the pump including the length Lo of the fluid guide of the pump. Thus it has been ascertained that the fluctuation reduction ratio is greatly reduced and the flow conditions of the coolant flowing through the reactor core is stabilized even if disturbance occurs.

From the foregoing, it will be understood that according to the invention, the provision of means for vertically guiding over a predetermined distance a flow of the coolant being sucked into each internal circulation pump permits increase in the effective inertia of such coolant flow so as to increase the time constant of the flow, thereby to enhance the stability of the flow conditions of the coolant flowing through the reactor core, which provides a nuclear reactor of high operation characteristics. It will be also understood that the use of venturi tubes for the guide means permits the provision of useful and effective means for measuring the flow rate of the coolant flowing through the reactor core.

We claim:

1. In a nuclear reactor comprising a reactor core, a shroud enclosing said reactor core, a pressure vessel surrounding said shroud and defining a vertical annular space between the vessel and the shroud, and a plurality of internal circulation pumps disposed in a lower portion of said vertical annular space for forcing a coolant in said vertical annular space to flow into below said reactor core so that the coolant flows through the reactor core in forced circulation, the improvement comprising means for vertically guiding over a predetermined distance a flow of the coolant being sucked into each said internal circulation pump to increase the effective inertia of the flow of the coolant, to thereby enhance the stability of the flow conditions of the coolant flowing through the reactor core, said guide means including a tubular guide member in the form of a venturi tube for each said internal circulation pump, and further comprising flow measurement means associated with said venturi tube for measuring the flow rate of the coolant flowing through said reactor core.

2. A nuclear reactor as claimed in claim 1, wherein said predetermined distance is about 2-10 times the diameter of a suction port of each said internal circulation pump when the length of a fluid guide of said pump is added thereto.

3. A nuclear reactor as claimed in claim 1, wherein said tubular guide member in disposed adjacent a suction port of each said internal circulation pump and extending substantially coaxially therewith in a vertical direction.

4. A nuclear reactor as claimed in claim 3, wherein said tubular guide member has at its upper and lower ends an inner diameter which is substantially equal to the diameter of an inlet of a casing of the internal circulation pump, and said tubular guide member is securedly connected at its lower end to an upper end of the casing.

5. A nuclear reactor as claimed in claim 3 or 4, wherein said tubular guide member has a length which is about 2-10 times the diameter of the suction port of the pump or the inlet of the casing when the length of the fluid guide of the pump is added thereto.

6. A device for forcing a coolant to circulate through a nuclear core within a nuclear reactor in which a vertical annular space is defined between a shroud enclosing the reactor core and a pressure vessel surrounding said shroud so that a coolant circulates within the nuclear reactor by flowing from said vertical annular space into below the core and then flowing through the core, said device comprising a plurality of internal circulation pumps located in a lower portion of said vertical annular space for forcing the coolant in said vertical annular space to flow into below said reactor core so that the coolant flows through the reactor core in forced circulation, and tubular guide members each disposed adjacent a suction port of each said internal circulation pump for vertically guiding a flow of the coolant being sucked into the internal circulation pump to thereby increase the effective inertia of the coolant flow, each said tubular guide member being a venturi tube, and further comprising flow measurement means associated with said venturi tube for measuring the flow rate of the coolant flowing through the reactor core.

7. A device as claimed in claim 6, wherein each said tubular guide member has a length which is about 2-10 times the diameter of a suction port of each said internal circulation pump when the length of a fluid guide of said pump is added thereto.

8. A device as claimed in claim 6 or 7, wherein each said tubular guide member has at its upper and lower ends an inner diameter which is substantially equal to the diameter of an inlet of a casing of said internal circulation pump, and said tubular guide member is securedly connected at its lower end to an upper end of the casing.

9. A device as claimed in claim 1, wherein said measurement means includes means for measuring the coolant delivery of each said internal circulation pump in accordance with a differential pressure of the associated venturi tube.

10. A device as claimed in claim 6, wherein said measurement means includes means for measuring the coolant delivery of each said internal circulation pump in accordance with a differential pressure of the associated venturi tube.

* * * * *